United States Patent [19]

Meyer

[11] Patent Number: 5,487,076
[45] Date of Patent: Jan. 23, 1996

[54] METHOD FOR SECURING DATA IN READ-WRITE MEMORIES IN MOBILE DATA STORAGE SYSTEMS

[75] Inventor: Heinrich Meyer, Nürnberg, Germany

[73] Assignee: Siemens Aktiengesellschaft, Munich, Germany

[21] Appl. No.: 85,265

[22] Filed: Jun. 29, 1993

[30] Foreign Application Priority Data

Jun. 30, 1992 [DE] Germany .......................... 42 21 406.8

[51] Int. Cl.⁶ .................................................. H03M 13/00
[52] U.S. Cl. .......................................... 371/40.1; 364/478
[58] Field of Search ........................ 371/40.1, 38, 8.2, 371/11.2, 10.1, 21.1, 37.1–40.4, 20.1; 364/468, 478; 235/380–382.5

[56] References Cited

U.S. PATENT DOCUMENTS

| | | | |
|---|---|---|---|
| 4,761,783 | 8/1988 | Christensen et al. | 371/38 |
| 4,780,809 | 10/1988 | Woffinden et al. | 371/40.1 |
| 4,821,198 | 4/1989 | Takeuchi et al. | 364/468 |
| 4,841,131 | 6/1989 | Iijima | 235/380 |
| 4,958,352 | 9/1990 | Noguchi et al. | 371/40.1 |
| 5,014,273 | 5/1991 | Gagliardo et al. | 371/40.1 |
| 5,113,349 | 5/1992 | Nakamura et al. | 364/478 |
| 5,153,842 | 10/1992 | Dlugos, Sr. et al. | 364/478 |
| 5,166,884 | 11/1992 | Mancy et al. | 364/468 |
| 5,170,046 | 12/1992 | Kusakabe | 235/380 |
| 5,173,905 | 12/1992 | Parkinson et al. | 371/40.1 |
| 5,202,923 | 4/1993 | Kuriyama | 371/40.1 |
| 5,206,866 | 4/1993 | Tanagawa | 371/40.1 |
| 5,233,610 | 8/1993 | Nakayama et al. | 371/40.1 |
| 5,267,173 | 11/1993 | Tanizawa et al. | 364/478 |
| 5,278,866 | 1/1994 | Nonami | 371/21.1 |
| 5,287,364 | 2/1994 | Kimura | 371/40.4 |
| 5,347,463 | 9/1994 | Nakamura et al. | 364/478 |
| 5,353,230 | 10/1994 | Maejima et al. | 364/468 |
| 5,396,432 | 3/1995 | Saka et al. | 364/468 |

OTHER PUBLICATIONS

R. Oldenburg Verlag, München/Wien, 1973: *Codierung zur Fehlerkorrektur und Fehlererkennung*, by Joachim Swoboda.

Primary Examiner—James P. Trammell
Attorney, Agent, or Firm—Kenyon & Kenyon

[57] ABSTRACT

To check the useful data of a read-write memory, subsets of the data are formed from the total quantity of useful data, and error-correction data are calculated for each subset of useful data. The subsets of useful data and the corresponding error-correction data are transmitted block-by-block to the read-write memory. During each reading operation, the block containing the desired useful data is read out and the integrity of that data is checked with the aid of the error-correction data.

2 Claims, 3 Drawing Sheets

| Address from a user's view | Address of memory S |
|---|---|
| 0 | 0 |
| 1 | 1 |
| . | . |
| . | . |
| 13 | 13 |
|  | 14 |
|  | 15 |
| 14 | 16 |
| 15 | 17 |
| . | . |
| . | . |
| 27 | 29 |
|  | 30 |
|  | 31 |
| 28 | 32 |
| 29 | 33 |
| . | . |
| . | . |
| 41 | 45 |
|  | 46 |
|  | 47 |
|  | 48 |
|  | . |
|  | . |
|  | 61 |

FIG 3

20250806# METHOD FOR SECURING DATA IN READ-WRITE MEMORIES IN MOBILE DATA STORAGE SYSTEMS

BACKGROUND OF THE INVENTION

The present invention relates to an improvement to read-write memories to enhance their useful life. More particularly, the present invention relates to improving a read-write memory, such as an EEPROM memory, that has only a limited number of write accesses, as well as a limited time for database organization.

The lifetime of a read-write memory depends heavily on the prevailing conditions of the application, especially on ambient temperature. Manufacturers of EEPROM memories typically guarantee a write frequency of 10,000 to 100,000 accesses. When these write cycles are exceeded, one has to be prepared for the fact that data may be corrupted in the memory. Therefore, the user has to ensure that the number of write accesses guaranteed by the manufacturer are not exceeded.

However, as laboratory tests have shown, the actual number of possible write accesses may be anywhere from 30 to 300 times more than the number of write cycles guaranteed by the manufacturer. However, any use beyond the guaranteed lifetime holds the danger of possible corruption of individual bits in the data memory.

SUMMARY OF THE INVENTION

The present invention provides a method which will allow the application lifetime read-write memory to be increased.

In accordance with the method according to the present invention a coding device forms a specified number of error-correction data, in each case from a subset of useful data. The total quantity of useful data is filed block-by-block in the read-write memory, whereby a block is composed of a subset of the useful data and the error-correction data assigned to that subset of useful data. When a memory query of at least one useful data is made, the block containing this data is read by the coding device, and the integrity of useful data is checked with the aid of the error-correction data associated with that subset. Each incorrect useful data, which is clearly recognized, is corrected by the coding device and if it is not possible to correct at least one useful data, an error message is output.

As a rule, an aging and stressed read-write memory, in particular an EEPROM memory, does not lose its entire data content at one time. Instead, it is only individual data bits which change their value in the memory over a longer time period. For this reason, it is not only useful to secure the data, but also to correct individual bit errors. This can be accomplished simply by means of an error-correction code, so that after the data are corrected, one can continue to use the memory again. However, if the ageing process is already so far along that the useful data can no longer be exactly reproduced by the error-correction code, then an error message signals this to the user, so that the memory can be replaced.

According to one advantageous refinement of the present invention, an error message is also produced when the useful data are again able to be fully reproduced. These error messages can then be acquired statistically by the user, so that conclusions can be drawn about the lifetime of the read-write memory.

BRIEF DESCRIPTION OF THE DRAWINGS

An embodiment of the present invention will be described in greater detail in the following on the basis of the drawings.

FIG. 3 illustrates an allocation of the memory addresses from a user's view.

DETAILED DESCRIPTION

Figure 1:
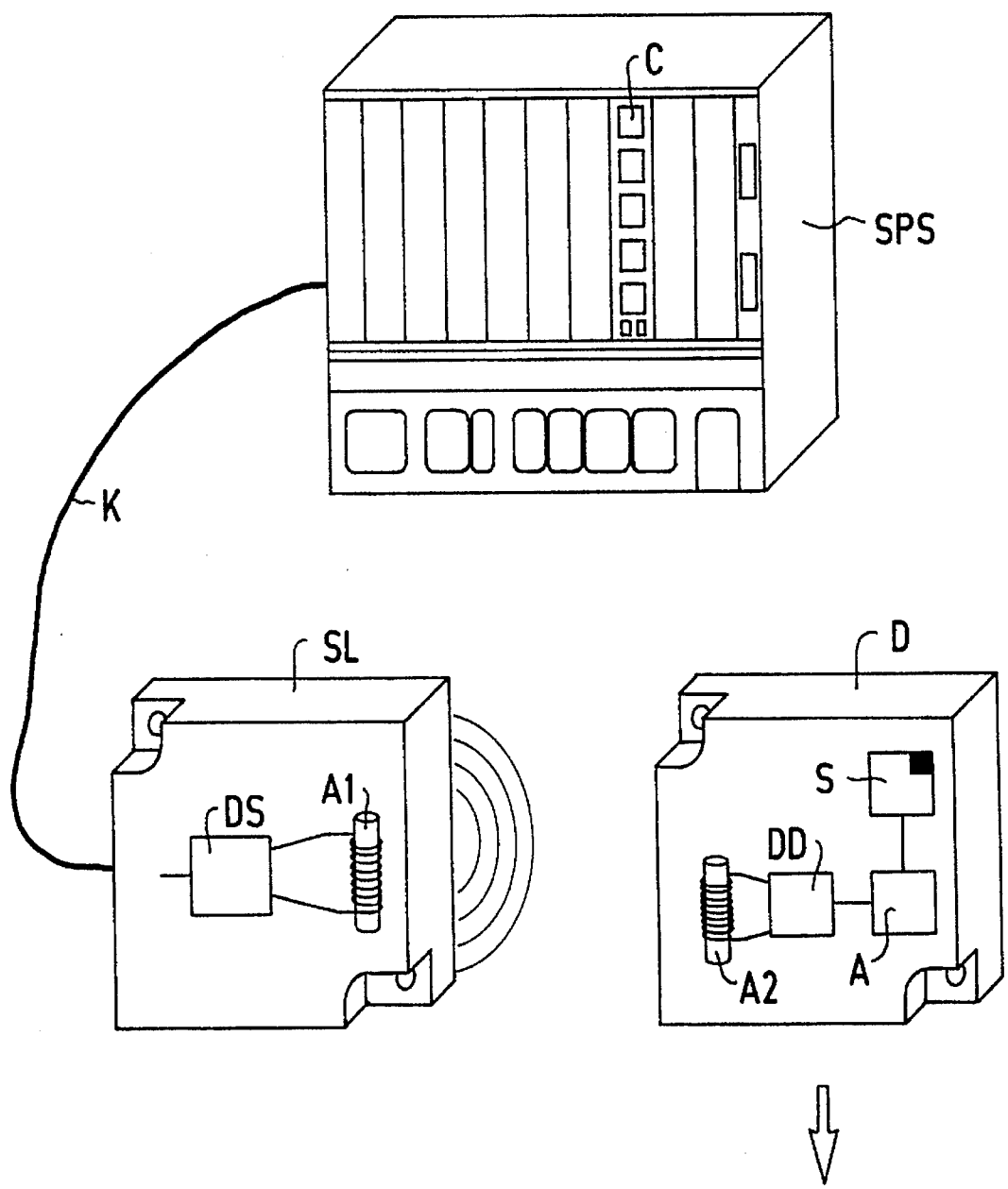
FIG. 1 illustrates a mobile data-storage system.

FIG. 1 depicts a programmable controller SPS, as used, for example, in programmable control systems. The programmable controller SPS is connected, via a cable K, to a read-write unit SL. In addition to the read-write unit, a mobile data-storage unit D is shown. The unit D is mounted to be stationary with a workpiece that is not shown, or is placed on a pallet on which a workpiece is transported. As indicated by the arrow, the mobile data-storage unit D is lead past various stations of a read-write unit SL.

The workpiece data that are relevant to production can be transmitted via the programmable controller SPS and the read-write unit SL to the data-storage unit D, which receives the data with antenna A2. The received data are then relayed via the demodulator DD to the control unit A, which, in turn, writes that data into memory S. In operation the mobile data-storage unit D traverses various processing stations with its associated workpiece. As a consequence the data storage unit D and the workpiece itself are exposed to the environmental influences of these processing stations. These environmental influences can greatly stress the read-write memory S situated in the data-storage unit D.

For the workpiece to undergo proper processing by the processing steps at the processing stations, in accordance with data in the read-write memory S, there must be a guarantee that the data in the read-write memory S are not faulty. For this purpose, the programmable controller SPS has a coding device C, which divides up all useful data N into subsets and calculates an error-correction code F for each of these subsets of useful data N. Each of these subsets of useful data N and correction data F are then filed block-by-block in the storage device S of the data storage unit D. This technique can also be employed in other devices which handle the operation of a data exchange. However, for the sake of clarity details of such alternative embodiments will not be described here since they would be clear to one of ordinary skill in the art from the description provided below.

Figure 2:
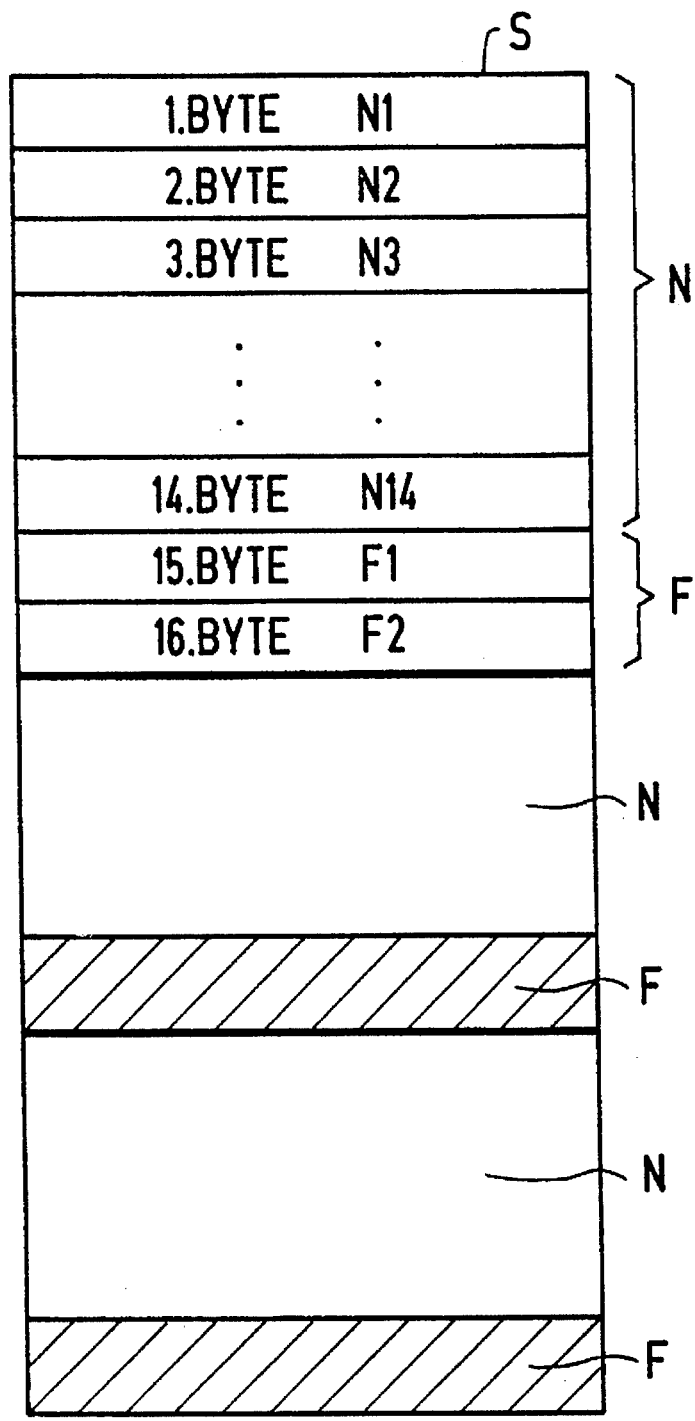
FIG. 2 illustrates a schematic partitioning of a read-write memory.

FIG. 2 illustrates a schematic representation of the read-write memory S, which is divided up into a plurality of blocks of data each block including 16 bytes of data. The first 14 bytes of a block are for useful data N, and bytes 15 through 16 for error correction data (ECC=ERROR CORRECTION CODE). These error correction data are calculated from the useful data in accordance with a conventional error correction method (an example of which is disclosed in Swoboda, Joachim, *Coding for Error Correction and Error Detection* [Codierung zur Fehlerkorrektur und Fehlererkennung], R. Oldenbourg Publishers, Munich, Vienna 1973). The following generator polynomial of the 16th degree can be used, for example, as a basis for calculating the error-correction data:

$$G(u)=u^{16}+u^{14}+u^{13}+u^{11}u^{10}+u^9+u^8+u^6+u^5+u+1$$

The generator polynomial has the following properties:
Minimum Hamming distance: h=5
Number of code positions capable of being secured with h: n=255
Number of errors capable of being corrected with the code: e=2 (whereby the errors can be distributed arbitrarily in the code positions).

A user, who only wants to access a certain number of useful data, sends an appropriate command to the coding device C, which is integrated in the programmable controller SPS. The device then finds the block in which the desired useful data are found and reads out those blocks from the read-write memory S. To this end, the coding device C converts the read command into a number of commands having a 16-byte block length, after which the useful data N, inclusive of the error-correction data F, are read out. The useful data N are then checked with the aid of the error-correction data F. In the checking operation error-correction data are calculated from the useful data N that have been read out and compared to the error-correction data F that have been read out of the last two bytes of the block. If an inconsistency in the data is determined as the result of the comparison, then a data-correction procedure is introduced. The number of data which are still capable of being corrected depends on the error-correction method being used. In the exemplified embodiment, for example, the "tipping over" of any two data bits per 16-byte block can still be corrected. If 3 bits per 16-byte block are corrupted, then they are certainly still detected as errors. Multiple-bit corruptions are no longer detected with a probability of $1.5 \times 10^{-5}$.

As a rule, a write command from the user is introduced by the coding device with an associated read command. The new useful user data are subsequently transmitted as bytes 1 through 14 of one block to the read-write memory S. Finally, the error-correction data are constructed by the coding device C from the useful data and are likewise transmitted to the read-write memory S. The coding device C can work transparently to the user, i.e., the error-correction data F do not appear to the user, so that the user merely needs to work with the useful data N. This is explained in greater detail on the basis of FIG. 3.

FIG. 3 depicts the addresses of the read-write memory S from a user's view in a tabular form, and the actual addresses of the memory locations of the read-write memory S. In each case, one block of the read-write memory thereby contains a total of 16 bytes on the addresses 0 through 15, 16 through 31, and 32 through 47; in each case 14 bytes of one block represent the useful data N and the two last bytes of one block represent the error-correction data F for that block.

However, these error-correction data F do not appear to the user. Instead, rather all useful data N have consecutively numbered addresses in an ascending order. The addresses of the useful data on the side of the user are then automatically assigned to the corresponding actual or physical addresses of the useful data of the read-write memory S by the coding device C. The addresses 0 through 13 are still identical, while, in the user's view, the other addresses of the useful data N are shifted with respect to the addresses of the useful data in the read-write memory S. For example, the user's address of "15" for a useful data byte is translated to the physical address of "17" by the coding device C.

If the coding device indicates that a threshold number of errors cannot be corrected or that a threshold number of blocks have been corrupted, then the device can signal the user that the time has come to replace the memory.

Thus, in accordance with the present invention the user can monitor the integrity of the memory on a block by block basis. This will enhance the useful lifetime of the memory.

What is claimed is:

1. A method for securing data in a conventional write-read memory in a mobile data storage system comprising the steps of:

a) generating a specified number of error-correction data in a stationary coding device from a subset of useful data;

b) filing the total quantity of useful data block-by-block in the write-read memory each block being composed of useful data and the error-correction data (F) assigned to the useful data of that block, wherein the write-read memory has a standard word width and contains no separate redundancy-generating device, and wherein the width of a unit of error correction data is adapted to the standard word width;

c) when a memory query of one useful data unit is made, reading a block of data containing this data unit from the corresponding write-read memory using the stationary coding device, whereupon the useful data of the read block are checked at the coding device with the aid of the error-correction data of that block while correcting each incorrect useful data unit which is clearly recognized, using the stationary coding device; and e) generating an error message as an output if it is not possible to correct at least one useful data unit.

2. The method according to claim 1, further comprising the step of also generating an error message when the useful data are corrected by the stationary coding device.

* * * * *